(12) United States Patent
Davis

(10) Patent No.: US 9,977,424 B2
(45) Date of Patent: May 22, 2018

(54) DYNAMICALLY CALCULATED REFRACTIVE INDEX FOR DETERMINING THE THICKNESS OF ROOFING MATERIALS

(71) Applicant: TAMKO Building Products, Inc., Joplin, MO (US)

(72) Inventor: Kyle Davis, Waxahachi, TX (US)

(73) Assignee: TAMKO Building Products, Inc., Joplin, MO (US)

( * ) Notice: Subject to any disclaimer, the term of this patent is extended or adjusted under 35 U.S.C. 154(b) by 489 days.

(21) Appl. No.: 14/709,178

(22) Filed: May 11, 2015

(65) Prior Publication Data

US 2015/0331414 A1  Nov. 19, 2015

Related U.S. Application Data

(60) Provisional application No. 61/993,049, filed on May 14, 2014.

(51) Int. Cl.
| | |
|---|---|
| *G05B 19/418* | (2006.01) |
| *E04D 5/10* | (2006.01) |
| *B29C 47/02* | (2006.01) |
| *B29C 47/92* | (2006.01) |

(52) U.S. Cl.
CPC ...... *G05B 19/41875* (2013.01); *B29C 47/025* (2013.01); *B29C 47/92* (2013.01); *E04D 5/10* (2013.01); *B29C 2947/92152* (2013.01); *D10B 2101/06* (2013.01); *D10B 2505/20* (2013.01); *G05B 2219/37398* (2013.01)

(58) Field of Classification Search
CPC .... G05B 19/41875; G05B 2219/37398; D06N 5/003; E04D 5/10
See application file for complete search history.

(56) References Cited

U.S. PATENT DOCUMENTS

| | | | | |
|---|---|---|---|---|
| 3,561,334 | A * | 2/1971 | Gerosa | E04D 7/00 106/122 |
| 2011/0034594 | A1* | 2/2011 | Scholten | C08L 53/02 524/68 |
| 2015/0233067 | A1* | 8/2015 | Coe | E01C 23/00 404/77 |

OTHER PUBLICATIONS

Jeffrey White, John Riccardi, Irl Duling, Jason Morga, Mike Friese; "Use of a Pulsed Terahertz Sensor for Coat Weight, Non-contact Caliper Thickness and Moisture Measurement"; Presented at PaperCon 2011.
Peter Jepsen, David Cooke, Martin Koch; "Terahertz spectroscopy and imaging—Modern techniques and applications"; Published in Laser Photonics Rev. 5, No. 1, 124-166 (2011).
Javaid Ikram; "Terahertz Time of Flight Detection for absolute thickness measurement of single side polished Silicon Wafers"; Thesis at University of North Carolina at Charlotte, 2010.

(Continued)

*Primary Examiner* — Mohamed Charioui
(74) *Attorney, Agent, or Firm* — William W. Cochran; Cochran Freund & Young LLC

(57) ABSTRACT

Disclosed is a system for measuring and controlling the thickness of asphalt roofing materials during manufacturing. Light beams are used to generate a time of flight signal that is used to determine the thickness of the asphalt roofing layer. A controller generates a thickness control signal that controls a coater to modify parameters of the coater to produce the asphalt roofing layer with a desired thickness.

5 Claims, 3 Drawing Sheets

(56) References Cited

OTHER PUBLICATIONS

Maxim Khazan; "Time-Domain Terahertz Spectroscopy and its application to the study of High-Tc Superconductor Thin Films" Dissertation at University of Hamburg, Apr. 16, 2002.
Payam Mousavi, Frank Haran, David Jez, Fadil Santosa, John Dodge; "Simultaneous composition and thickness measurement of paper using terahertz time-domain spectroscopy"; received Sep. 9, 2009; published Nov. 19, 2009.

* cited by examiner

DYNAMICALLY CALCULATED REFRACTIVE INDEX FOR DETERMINING THE THICKNESS OF ROOFING MATERIALS

CROSS-REFERENCE TO RELATED APPLICATION

This application is based upon and claims priority to U.S. provisional application Ser. No. 61/993,049, filed May 14, 2014, entitled "Dynamically Calculated Refractive Index for Determining the Thickness of Roofing Materials," which application is specifically incorporated herein by reference for all that it discloses and teaches.

BACKGROUND

Asphalt shingles and asphalt roll roofing have been used extensively in the roofing industry. Asphalt shingles and asphalt roll roofing provide a durable and long lasting roofing material at an economical price. Numerous control processes exist for manufacturing roofing products that effectively control the manufacturing process.

SUMMARY

An embodiment of the present invention may therefore comprise a method of controlling the thickness of an asphalt roofing layer during manufacturing comprising: measuring temperature and density of the asphalt roofing layer; determining a refractive index for the asphalt roofing layer, that varies with density and temperature of the asphalt roofing layer, using empirical data; measuring time of flight of a light beam through the asphalt roofing layer; calculating the thickness of the asphalt roofing layer by multiplying the time of flight by speed of light divided by the refractive index to obtain a measured thickness; comparing the measured thickness of the asphalt roofing layer with a desired thickness to generate an error signal; using the error signal to generate a control signal in a controller; using the control signal to control the measured thickness of the asphalt roofing layer during manufacture of the asphalt roofing layer.

An embodiment of the present invention may further comprise a method of controlling the thickness of an asphalt roofing layer during manufacturing comprising: measuring temperature and density of the asphalt roofing layer; determining a refractive index for the asphalt roofing layer, that varies with density and temperature of the asphalt roofing layer, using empirical data; measuring time of flight of a light beam through the asphalt roofing layer; calculating the thickness of the asphalt roofing layer by multiplying the time of flight by speed of light divided by the refractive index to obtain a measured thickness; calculating a target thickness using a final desired thickness and a volumetric thermal expansion equation; comparing the measured thickness of the asphalt roofing layer with a target thickness to generate an error signal; using the error signal to generate a control signal in a controller; using the control signal to control the measured thickness of the asphalt roofing layer during manufacture of the asphalt roofing layer.

An embodiment of the present invention may further comprise a system for controlling the thickness of an asphalt layer comprising: a temperature gauge that measures a temperature value of the asphalt layer; a density gauge that measures a density value of the asphalt layer; a time domain spectrometer that measures time of flight of a light beam through the asphalt layer to obtain a time of flight value; a processor that calculates a refractive index value for the asphalt layer using the temperature value, the density value and the time of flight value in a refractive index equation derived from directly measured values of speed of light through asphalt for various filler percentages at various temperatures, and that calculates the thickness of the asphalt layer by multiplying the time of flight value by the speed of light divided by the refractive index value; a controller that compares the thickness of the asphalt layer with a desired thickness to generate an error signal, and generates a control signal, based upon the error signal, that is used to control the thickness of the asphalt layer during manufacturing of the asphalt roofing layer.

An embodiment of the present invention may further comprise a system for controlling the thickness of an asphalt layer comprising: a temperature gauge that measures a temperature value of the asphalt layer; a density gauge that measures a density value of the asphalt layer; a time domain spectrometer that measures time of flight of a light beam through the asphalt layer to obtain a time of flight value; a processor that calculates a refractive index value for the asphalt layer using the temperature value, the density value and the time of flight value in a refractive index equation derived from directly measured values of speed of light through asphalt for various filler percentages at various temperatures, and that calculates the thickness of the asphalt layer by multiplying the time of flight value by the speed of light divided by the refractive index value to obtain a measured thickness of the asphalt layer, and that calculates a target thickness using a final desired thickness and a volumetric thermal expansion equation; a controller that compares the measured thickness of the asphalt layer with the target thickness of the asphalt layer to generate an error signal, and generates a control signal, based upon the error signal, that is used to control the thickness of the asphalt layer during manufacturing of the asphalt roofing layer.

DETAILED DESCRIPTION OF THE EMBODIMENTS

Figure 1:
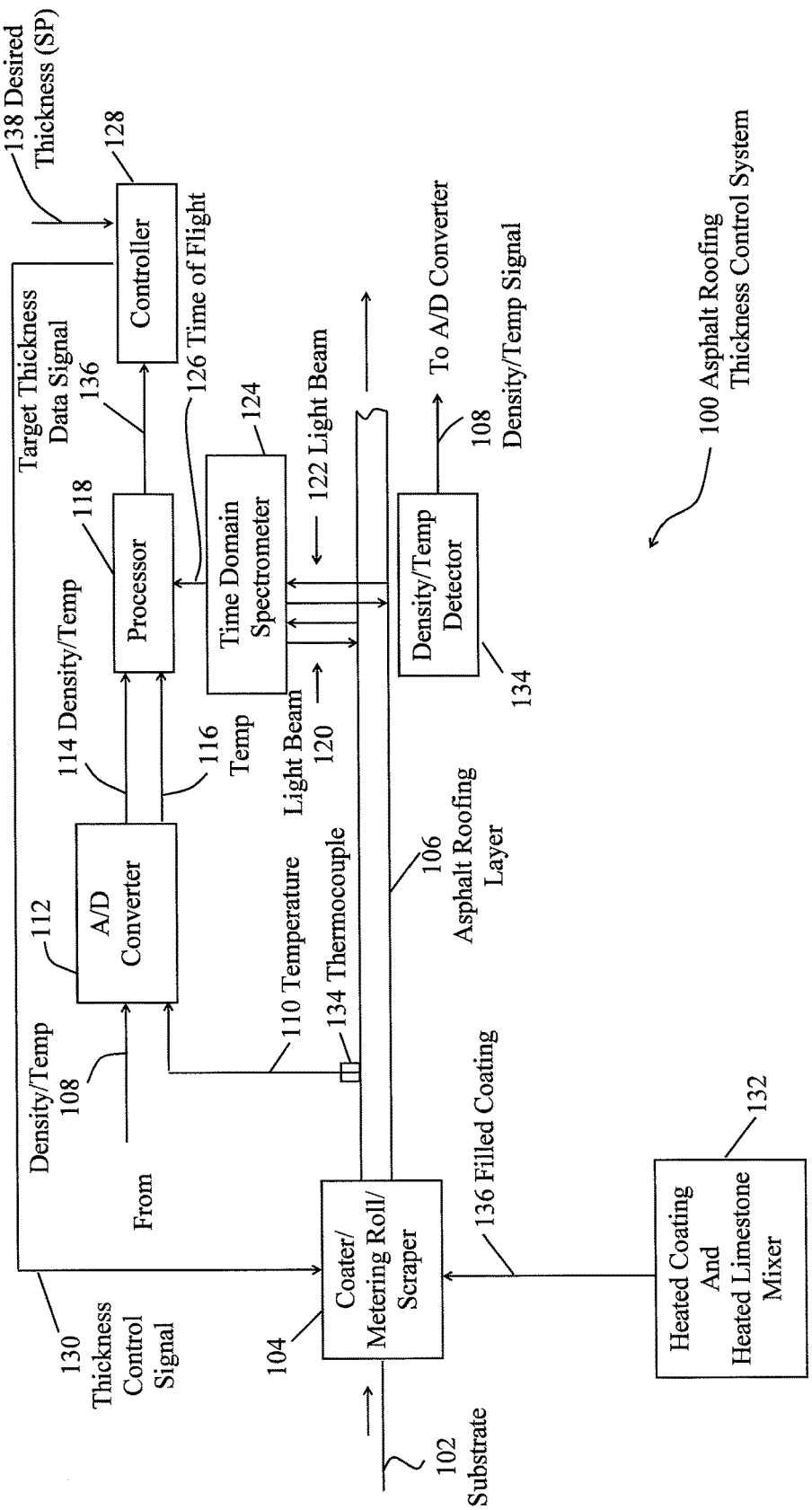
FIG. 1 is a schematic block diagram of an asphalt roofing thickness control system.

FIG. 1 is a schematic block diagram of an asphalt roofing thickness control system 100. As illustrated in FIG. 1, a substrate material 102 is supplied to a coater/metering roll/scraper 104. The substrate 102 may be a fiberglass substrate, such as disclosed in U.S. Patent Application Ser. No. 61/952,024, filed Mar. 12, 2014, by David C. Humphreys, Steven Russell and Michael Shifferd, and assigned to TAMKO Building Products, Inc., which is specifically incorporated herein by reference for all that it discloses and teaches. Various other types of substrate materials can be used, including felt, or a similar material. The coater includes a metering roll, in which a metered amount of asphalt is applied to the top surface of the substrate 102. In a second step, a back coating is applied to the substrate, which coats the lower side of the substrate, which is then scraped by a scraper to obtain the desired thickness. The output of the coater 104 is the asphalt roofing layer 106, that has a thickness determined by the metering roll and scraper of the coater 104. The coating asphalt is supplied from a heated coating and heated limestone mixer 132. A density/temperature gauge 134 provides a density signal and a temperature signal 108 that is applied to the A/D converter. The filled coating 136 is then provided to the coater/metering roll/scraper 104. The coater 104 provides a metered amount of asphalt to the top layer of the substrate 102. The bottom layer of the substrate 102 is then coated with an asphalt layer that is scraped by a scraper to obtain the desired thickness of the bottom layer of asphalt. This is disclosed in more detail with respect to U.S. Application Ser. No. 61/952,024, filed Mar. 12, 2014, by David C. Humphreys, Steven Russell and Michael Shifferd, entitled "Peel and Stick Waterproofing Material," which is specifically incorporated herein, by reference, for all that it discloses and teaches. The metered amount of asphalt that is applied to the substrate 102, as well as the position of the scraper, determine the thickness of the asphalt roofing layer 106.

It is desirable to have a uniform and consistent thickness of the asphalt roofing layer 106, so that variations in the product are minimized. The variations in thickness of the asphalt roofing layer 106 become apparent in the differences in the weight of packets of asphalt shingles and rolls of asphalt rolled roofing. A uniform and consistent product is desirable in order to ensure quality of the asphalt roofing layer 106. In order to ensure a uniform thickness, a thickness control signal 130, generated by controller 128, is applied to the coater 104 to control the process of metering the asphalt on the top layer of the substrate and controlling the position of the scraper to control the thickness of the bottom layer of asphalt on the substrate 102.

The density/temperature gauge 134, illustrated in FIG. 1, provides both a temperature and a density signal that are digitized by the converter 112. The density signal provides a value for the density of the filled coating 136 prior to entering the coater 104. The filled coating 136 has a density that varies with temperature, as a result of thermal expansion. A temperature detector, such as an infrared sensor that is part of the density/temperature gauge 134, measures the temperature of the asphalt roofing layer 106. An infrared sensor, or other temperature sensing device, is located proximate to the time domain spectrometer 124. In this manner, the temperature of the filled coating 136 can be detected at a location proximate to the time domain spectrometer 124, so that the density/temperature signal 108, generated by the density/temperature gauge 134, measures the temperature of the asphalt roofing layer 106, proximate to the time domain spectrometer 124.

In one embodiment of the device illustrated in FIG. 1, the time domain spectrometer 124 may comprise a terahertz time domain spectrometer that measures the time of flight of light beam 120 reflected from the top surface of the asphalt roofing layer 106, and light beam 122 that reflect from the bottom surface of the asphalt roofing layer 106. The difference in the time of flight of the light beam 120 and light beam 122 can provide a very accurate measurement of the thickness of the asphalt roofing layer 106. The time of flight signal 126 is transmitted to the processor 118, together with the digital density signal 114 and digital temperature signal 116. The processor 118 calculates the thickness of the asphalt roofing layer 106 and transmits the thickness data signal 126 to the controller 128. The processor 118 calculates the expected contraction of the asphalt roofing layer due to the effects of thermal expansion and determines the target thickness of the asphalt roofing layer at the point of application to achieve the desired final thickness of the asphalt roofing layer of the final product. The controller 128 may be a simple proportional controller, a proportional-integral controller, a proportional-integral-derivative controller, a boundary controller, or a Model Predictive Controller. In that regard, the thickness data signal 136 may constitute the process variable (PV), which is compared to the set point (SP), which is the desired thickness of the asphalt roofing layer at the point of application 106. The thickness control signal 130 constitutes the manipulated variable (MV), that is used to control the coater 104 to obtain the desired thickness of the asphalt roofing layer 106.

The time domain spectrometer 124 may constitute a terahertz probe, which is available from Advanced Photonix/Picometrix, Inc. (API) 2925 Boardwalk, Ann Arbor, Mich. 48104 and Thermo Fisher Scientific, Inc., 2650 Crescent Drive, #100, Lafayette, Colo. 80026. The time of flight signal 126 may constitute the time of flight of the light beam 122 through the asphalt roofing layer 106. The time of flight of the light beam 122 through the asphalt roofing layer 106 can be calculated as the difference between the time of flight of the light beam 120 and light beam 122. The processor 118 performs various tasks that are outlined in more detail in FIG. 2.

Figure 2:
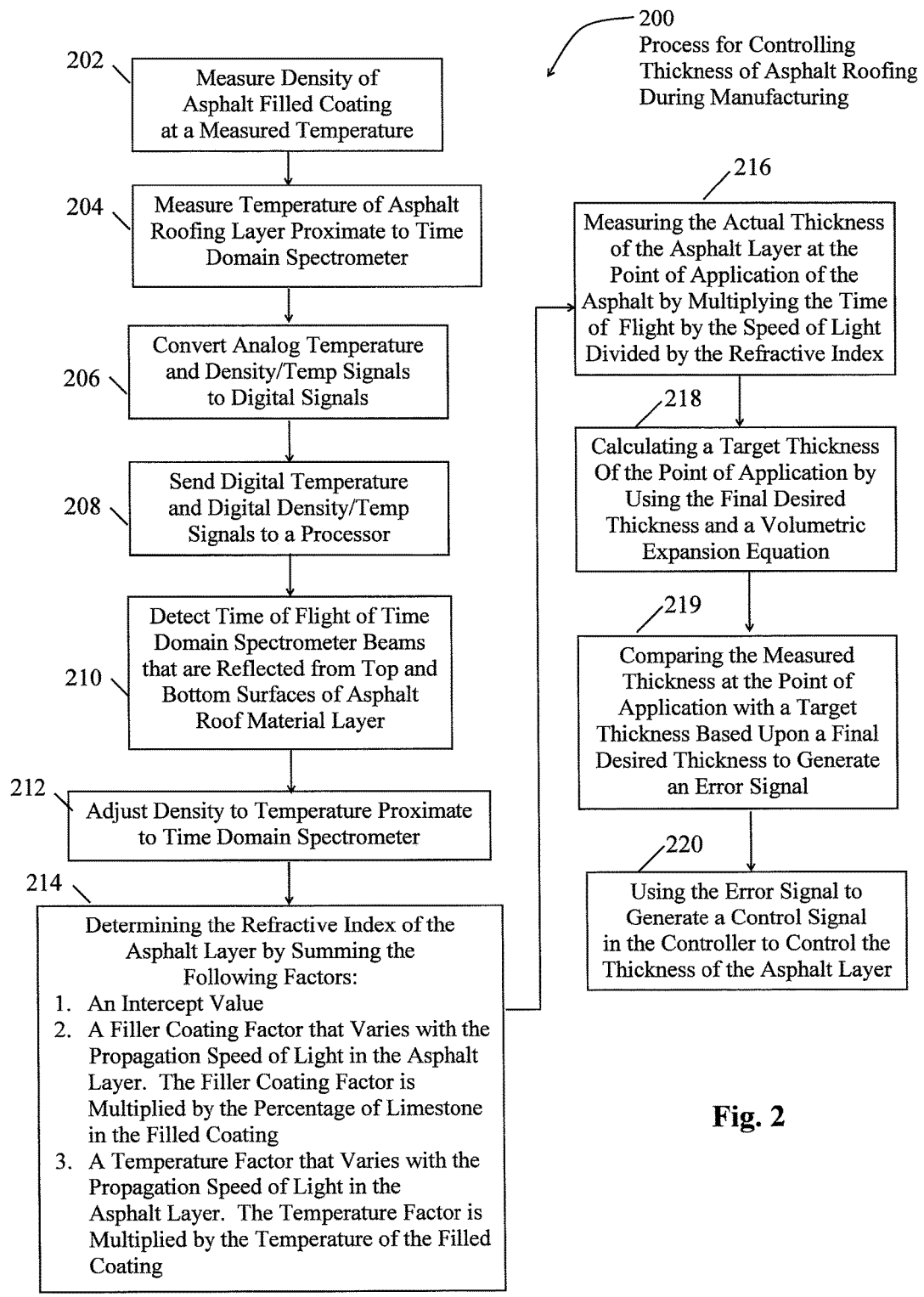
FIG. 2 is a flow diagram illustrating the process for controlling thickness of the asphalt roofing during manufacturing.

FIG. 2 is a process 200 for controlling the thickness of an asphalt roofing layer during manufacturing. At step 202, the density of the asphalt roofing material is measured, as well as the temperature, by the density/temperature gauge 134. In other words, the density is determined at the temperature when the filled coating 136 is moved from the mixer 132 to the coating/metering roll/scraper 104. At step 204, the temperature of the asphalt roofing layer 106 is measured by the density/temperature detector 134 proximate to the location of the time domain spectrometer 124. This temperature signal is used to calculate the density of the asphalt roofing layer 106 at a location proximate to where the thickness of the asphalt roofing layer 106 is measured. The density/temperature signal 108 provides the density of the filled coating 134 at a first temperature. The density can then be recalculated in the processor 118 at the second temperature 110 measured by the density/temperature detector 134 proximate to the location where the thickness of the asphalt roofing layer 106 is measured by the time domain spectrometer 124. In that manner, a more accurate measurement of thickness can be provided since a more accurate density value can be provided to the processor 118.

Referring again to FIG. 2, at step 206, the A/D converter 112 converts the density/temperature signal 108 and the temperature signal 110 to a digital density/temperature signal 114 and a digital temperature signal 116. At step 208, the digital density/temperature signal 114 and the temperature signal 116 are sent to the processor 118. At step 210, the time of flight of the light beams 120, which reflects off the top surface of the asphalt roofing layer 106, and light beam 122, that reflects off the bottom surface of the asphalt roofing layer, are detected. Time domain spectrometer 124 then determines the difference in flight times, which is indicative of the flight time of the light beam 122 through the asphalt roofing layer 106. This time of flight signal 126 is then transmitted to the processor 118. At step 212, the processor 118 adjusts the density of the asphalt roofing layer 106 based upon the temperature signal 108 and the temperature signal 110 measured by density/temperature detector 134. Densities of the filled coating 136 can be measured empirically at various temperatures, so that the density of the asphalt roofing layer 106 can be determined at the location of the density/temperature detector 134 that is proximate to the time domain spectrometer 124.

As also illustrated in FIG. 2, the refractive index of the asphalt roofing layer 106 is determined at step 214. The refractive index is determined by summing various factors. The first factor is the filler coating factor, which is the percent contribution to the refractive index of the filler, which is the ratio of limestone to coating in the filled coating. As the ratio of limestone to coating increases, the propagation speed of light decreases. In other words, as the density increases, the speed of light decreases. The second factor is the temperature factor, which is the contribution of the temperature of the filled coating to the refractive index. As the temperature of the filled coating decreases, the filled coating undergoes thermal contraction, which increases density and decreases the propagation speed of light through the filled coating. The third factor is the intercept value, which is a constant value applied to the refractive index to account for an increase in the propagation speed of light through the filled coating, by a constant amount, regardless of the ratio of limestone to coating and temperature. Propagation data points for the speed of light through an asphalt layer can be obtained for a variety of different filler factors and temperatures. These data points can be obtained using an External Reference Structure (ERS) so that the speed of light propagated through the asphalt layer can be directly measured. These data points are then used to generate a refractive index equation using regression analysis or a least squares analysis technique, or a combination of the two. The equation includes an intercept value, a variable filler factor and a variable temperature factor that is multiplied by the temperature of the asphalt layer. The filler factor varies the propagation speed of light in the asphalt layer as a function of the percentage of filler in the filled coating 136. The greater the percentage of filler, the slower the propagation speed. The temperature factor varies the propagation speed of light in the asphalt layer as a function of the temperature. The higher the temperature, the faster the propagation speed. The filler factor is multiplied by the percentage of filler and the temperature factor is multiplied by the temperature of the asphalt roofing layer 106 to obtain refractive index values for these factors. These values, plus the intercept value, are added together to obtain a refractive index number. The refractive index equation is given below:

$$RI = (\text{Filler factor})(\% \text{ of Filler}) + (\text{Temp Factor})(\text{Temperature}) + \text{Intercept Value} \quad \text{Eq. (1)}$$

At step 216 of FIG. 2, the measured thickness of the asphalt layer is determined by multiplying the time of flight signal 126, which is the difference between the time of flight of light beam 120 and light beam 122, by the speed of light. That product is then divided by the refractive index. In other words, the following equation is used to generate a thickness number:

$$\text{Thickness} = (\text{time of flight}) * (\text{speed of light} / \text{refractive index}) \quad \text{Equation (2)}$$

At step 218 of FIG. 2, the target thickness of the asphalt roofing layer at the point of application is determined in order to achieve a desired final product thickness. The target thickness of the asphalt roofing layer at the point of application is calculated by taking the temperature measurement from an infrared sensor in the density/temperature detector 134, and calculating the expected contraction of the material from the temperature of the asphalt at the point of the asphalt application to the asphalt roofing layer thickness in the final product at room temperature using equation (3).

$$\text{Change in Volume} = (\text{initial volume}) * (\text{Volumetric coefficient of thermal expansion}) * (\text{final temperature} - \text{initial temperature}) \quad \text{Equation (3)}$$

Utilizing the Volumetric Thermal Expansion Equation (Equation 3), the required target thickness of the asphalt roofing layer that is required to achieve the desired final product thickness of the asphalt roofing layer is calculated based upon the volumetric coefficient of thermal expansion for the current filler percentage or density value as measured by the density gauge in the density/temperature detector 134 and the initial temperature at the point of application as measured by the infrared sensor in the density/temperature detector 134. The Volumetric coefficient of thermal expansion for filled coating can be obtained for different filler percentages by utilizing a time domain spectrometer 124, an infrared sensor, and an external reference structure (ERS) capable of holding liquid samples. The asphalt samples at different filler percentages are placed in an external reference structure and convectively cooled to room temperature while continuously measuring the volume and temperature of the sample throughout the entire temperature range of interest. These data points are used to calculate the volumetric coefficient of thermal expansion at different filler percentages. Setting the target thickness of the asphalt roofing layer at the point of asphalt application to account for the expected changes in thickness due to the thermal contraction of the material adjusts for the impact of varying starting temperature conditions of the filled coating as seen in FIG. 3.

The target thickness data signal 136 determined by Equation (1), is then sent to the controller 128 as the process variable (PV) at step 218. The controller 128 compares the target thickness data signal 136 with a desired target thickness 138 and generates an error signal that is processed by the controller 128, in a PID controller, PI controller, a simple proportional controller, or any desired type of controller known in the art. A manipulated variable signal is then generated by the controller 128 as the thickness control signal 130 at step 220. The thickness control signal 130 is then applied to the coater 104 to control the thickness of the asphalt roofing layer 106. These processes are performed by the controller 128, in accordance with standard control methods.

Figure 3:
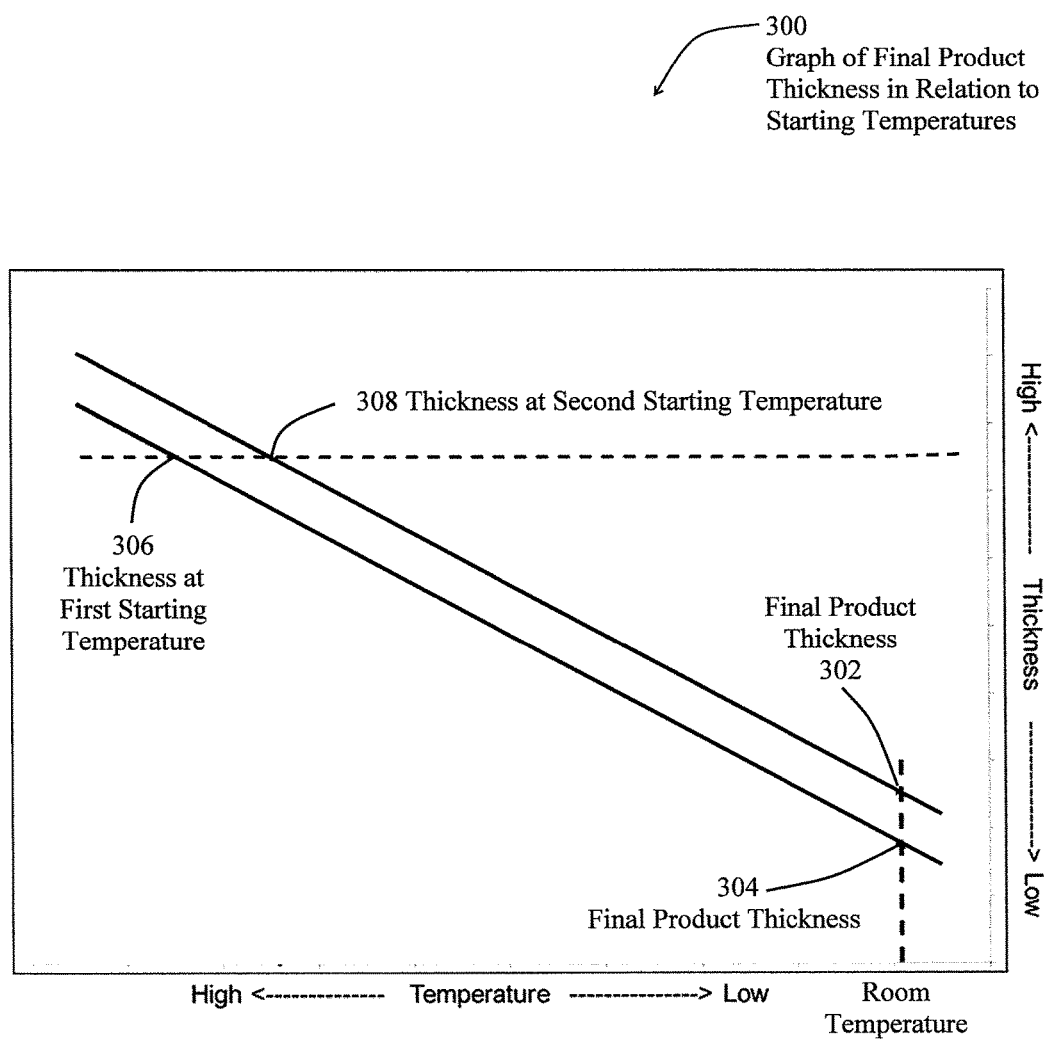
FIG. 3 is a graph illustrating the relationship between the final product thickness and the starting temperature of the asphalt.

FIG. 3 is a graph 300 that illustrates a final product thickness in relationship to the starting temperatures of the asphalt. As shown in FIG. 3, the temperature value is plotted on the x axis of the graph 300, while the thickness value is plotted on the y ordinate. As illustrated in the graph 300, a final product thickness 304 of the asphalt layer at room temperature corresponds to thickness of the asphalt layer at a first starting temperature 306. In comparison, a final product thickness 302 of the asphalt layer corresponds to a thickness at a second starting temperature 308 of the asphalt layer. As can be seen from FIG. 3, the starting temperature has a proportional linear relationship to the final product thickness at room temperature. Accordingly, to obtain a desired final product thickness, a target thickness at a particular starting temperature must be used. Since there is a linear relationship between the thickness and the starting temperature and the thickness at room temperature, the measured thickness for any particular starting temperature can be adjusted to obtain the final product thickness at room temperature. Accordingly, the thickness control signal 130 can be adjusted to adjust the coater 104 by using the desired final product thickness, the temperature and the volumetric thermal expansion equation that is illustrated in FIG. 3.

Accordingly, embodiments are disclosed that can measure the thickness of an asphalt roofing layer 106 during the manufacturing process using time of flight data and a refractive index value that is representative of the speed of propagation of light through the asphalt roofing layer 106 using both temperature and density data. A thickness control signal is generated by the controller 128 to control the coating and scraping process for creating the asphalt roofing layer 106 that has an accurate and consistent thickness.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for controlling the thickness of an asphalt layer comprising:
    a temperature gauge that measures a temperature value of said asphalt layer;
    a density gauge that measures a density value of said asphalt layer;
    a time domain spectrometer that measures time of flight of a light beam through said asphalt layer to obtain a time of flight value;
    a processor that calculates a refractive index value for said asphalt layer using said temperature value, said density value and said time of flight value in a refractive index equation derived from directly measured values of speed of light through asphalt for various filler percentages at various temperatures, and that calculates said thickness of said asphalt layer by multiplying said time of flight value by said speed of light divided by said refractive index value;
    a controller that compares said thickness of said asphalt layer with a desired thickness to generate an error signal, and generates a control signal, based upon said error signal, that is used to control said thickness of said asphalt layer during manufacturing of said asphalt roofing layer.

2. The system of claim 1 wherein said time domain spectrometer comprises:
    a time domain spectrometer that transmits light beams that reflect from a top surface of said asphalt layer and a bottom surface of said asphalt layer.

3. The system of claim 1 wherein said processor uses regression analysis or least squares analysis to derive said refractive index equation.

4. A system for controlling the thickness of an asphalt layer comprising:
    a temperature gauge that measures a temperature value of said asphalt layer;
    a density gauge that measures a density value of said asphalt layer;
    a time domain spectrometer that measures time of flight of a light beam through said asphalt layer to obtain a time of flight value;
    a processor that calculates a refractive index value for said asphalt layer using said temperature value, said density value and said time of flight value in a refractive index equation derived from directly measured values of speed of light through asphalt for various filler percentages at various temperatures, and that calculates said thickness of said asphalt layer by multiplying said time of flight value by said speed of light divided by said refractive index value to obtain a measured thickness of said asphalt layer, and that calculates a target thickness using a final desired thickness and a volumetric thermal expansion equation;
    a controller that compares said measured thickness of said asphalt layer with said target thickness of said asphalt layer to generate an error signal, and generates a control signal, based upon said error signal, that is used to control said thickness of said asphalt layer during manufacturing of said asphalt roofing layer.

5. The system of claim 4 wherein said processor uses regression analysis or least squares analysis to derive said refractive index equation.

\* \* \* \* \*